2,862,809
Patented Dec. 2, 1958

2,862,809

SODA ASH BRIQUETTE AND ITS METHOD OF MANUFACTURE

Donald D. Threlkeld, Brandenburg, Ky., assignor to Olin Mathieson Chemical Corporation, a corporation of Virginia No Drawing. Application August 14, 1956
Serial No. 603,874

7 Claims. (Cl. 75—55)

This invention relates to a method for pressing sodium carbonate powder into briquettes, using polyethylene or polypropylene glycols as binding agents therefor.

Sodium carbonate is used in the steel industry where it is added to molten iron to remove the sulfur present. At present the sodium carbonate is melted and molded into briquettes in order to be suitable for use.

It is an object of this invention to provide a process for manufacturing sodium carbonate briquettes wherein the large heat requirements for melting sodium carbonate are obviated. A further object is to teach a method for briquetting the light grade of sodium carbonate, which is not suitable for addition to the iron melt since the fine particles are blown out and do not react to remove the sulfur.

The briquetted soda ash products of the present invention are also useful for the preparation of charges to a glass furnace and for other purposes where fine light soda ash may not be suitable.

To be satisfactory for use in the desulfurization treatment of molten iron, sodium carbonate must be sufficiently hard and resistant to crumbling to be shipped and used without the formation of excessive amounts of fines. An empirical test to measure the resistance of the pelletized material to crumbling is known as the shatter factor. This is determined by allowing the pellets and any fragments formed from them to drop 3 times from a height of 6 feet onto a steel plate and finally sieving the resulting particles. The weight percent retained on each of the screens (U. S. Standard Sieve) listed below is multiplied by the factor opposite to obtain a value. The sum of these values is the shatter factor.

| Weight percent | Factor |
|---|---|
| On 1 inch screen | 1.0 |
| On ¾ inch screen | 0.875 |
| On ½ inch screen | 0.675 |
| On ¼ inch screen | 0.375 |
| Through ¼ inch screen | 0.175 |

A shatter factor above approximately 90 indicates that the material is satisfactory in shipment, handling and use in the iron foundry.

The process of the present invention comprises the uniform incorporation in light soda ash of from about 0.2 to 5 percent by weight of polyethylene glycols or polypropylene glycols and pressing the mixture into pellets or briquettes of any desired shape and size. Preferably about 0.5 to 2 percent of the polyethylene glycols, based on the soda ash weight, are used and particularly satisfactory results have been obtained using about one percent. The blend may be prepared in any convenient way which results in a uniform mixture. It is particularly convenient to mix the amount of polyglycol to be used for a large batch with a small portion of the soda ash to be treated and to blend the dry mixture with the remainder of the soda ash. In this way uniform incorporation of the polyglycol into the whole of the soda ash is accomplished.

Using the stated range of percentage of polyglycol binder, pellets having a satisfactory shatter factor can be obtained. However the shatter factor is at times improved, particularly using other proportions of binder, when the pellets are subjected to a subsequent heat treatment. To improve the shatter factor, the heat treatment is suitably carried out for 0.5 to 2 hours, preferably about one hour, at about 200 to 250° F. However, temperatures as high as 350° F. have been used satisfactorily.

The polyglycols suitable for use as binders for light soda ash according to the present invention include diethylene glycol, triethylene glycol, higher liquid polyethylene glycols, having average molecular weights of 200, 400, 600, dipropylene glycol, tripropylene glycol, polypropylene glycols having average molecular weights of 150, 425, 750, 1025, 1200 or 2025, and mixtures thereof. Particularly satisfactory results were obtained using a bottoms mixture from the manufacture of ethylene glycol. It contained about 82 weight percent of diethylene glycol, 16 weight percent of triethylene glycol and 2 weight percent of ethylene glycol. Another suitable polyglycol mixture comprises 50 weight percent of triethylene glycol, 25 weight percent of higher glycols and 25 weight percent of water-insoluble tars.

Briquetting pressures of 15,000 p. s. i. g. are satisfactory using the polyglycol-soda ash compositions described. However pressures as low as about 5000 p. s. i. g. and as high as about 20,000 p. s. i. g. or more can be used. These pressures need be maintained only briefly and as soon as attained may be released. Starting at room temperature, a minor increase in temperature occurs. This procedure produces pellets of satisfactory shatter factor.

The polyalkylene glycols are peculiarly appropriate binders for soda ash. Some chemical action may occur with the alkaline soda ash to produce the effective binding agent. In addition the polyethylene glycols are especially suitable because they introduce no components which interfere with the utility of the pellets. In the iron melt, the minor proportion of polyglycols on their reaction products result in so little carbon that the proportion in the iron is not significantly affected. No metallic, non-volatile or objectionable residues remain to affect the composition of the melt.

*Examples I–X*

One pound lots of fine, light grade sodium carbonate were intimately mixed with various proportions of a polyethylene glycol composition containing about 82 weight percent of diethylene glycol, 16 weight percent of triethylene glycol and 2 weight percent of ethylene glycol, and pressed into briquettes at 15,000 p. s. i. g. at room temperature. These briquettes were cylindrically shaped, with a cross-sectional area of about one square inch and a length of about one inch, weighing about 60 grams. The table below indicates the percent by weight of binder and the shatter factor before and after heat treatment.

| Example No. | Percent Binder | Shatter Factor | |
|---|---|---|---|
| | | Before Heat Treatment | After Heat Treatment (1 hr. at 215° F.) |
| Blank | 0.0 | Broke on discharging from press | |
| I, II | 0.5 | 87.6 | 96.7 |
| III, IV | 1.0 | 99.9 | 91.7 |
| V, VI | 2.0 | 95.0 | 94.3 |
| VII, VIII | 3.0 | 90.1 | 98.4 |
| IX, X | 5.0 | 90.8 | 97.8 |

Example XI

Another sample of fine, light soda ash (58 percent Na₂O) was uniformly mixed with 1 percent by weight of the mixed polyglycols used in the preceding examples. The mixture was pressed at 15,000 p. s. i. g. at room temperature in a mold producing pellets about 1.2 inches in diameter and 1 to 1.5 inches in length. They had a density of 1.62 grams per cubic centimeter or 101.1 pounds per cubic foot. When added to molten iron, these pellets desulfurize in the same way as the conventional fused briquettes. Exposed to the atmosphere for about one week with variations in humidity, no apparent change occurred.

I claim:

1. A method for the manufacture of briquettes which comprises admixing light soda ash and from about 0.5 to 5 percent by weight, based on the weight of the soda ash, of at least one liquid material selected from the group consisting of diethylene glycol and triethylene glycol, to form an intimate mixture, and thereafter forming the mixture into briquettes by the application of pressure.

2. The method of claim 1 wherein the amount of said material employed is approximately 1 percent by weight, based upon the weight of the soda ash.

3. The method of claim 1 wherein said material consists essentially of the following materials in the following percentages by weight: diethylene glycol, 82 percent; triethylene glycol, 16 percent; and ethylene glycol, 2 percent.

4. The method of claim 1 wherein the amount of said material employed is approximately 1 percent by weight, based upon the weight of the soda ash and wherein the material consists essentially of the following materials in the following percentages by weight: diethylene glycol, 82 percent; triethylene glycol, 16 percent; and ethylene glycol, 2 percent.

5. A soda ash briquette consisting essentially of finely divided particles of light soda ash bound together by at least one normally liquid material selected from the group consisting of diethylene glycol and triethylene glycol, said material being present in the amount of from about 0.5 to 5 percent by weight based on the weight of soda ash.

6. The method for the manufacture of briquettes which comprises admixing light soda ash and from about 3 to 5 percent by weight, based on the weight of the soda ash, of a polyethylene glycol composition consisting essentially of about 82 weight percent of diethylene glycol, 16 weight percent of triethylene glycol and 2 weight percent of ethylene glycol, forming the admixture into pellets by application of pressure and heat treating the pellets for about 0.5 to 2 hours at about 200° to 350° F.

7. The soda ash briquette of claim 5 in which the liquid material consists essentially of about 82 weight percent of diethylene glycol, 16 weight percent of triethylene glycol and 2 weight percent of ethylene glycol.

References Cited in the file of this patent

UNITED STATES PATENTS

| | | |
|---|---|---|
| 1,826,881 | Hennig | Oct. 13, 1931 |
| 2,334,499 | Millard | Nov. 16, 1943 |

OTHER REFERENCES

McClelland et al.: Chemical and Engineering News, vol. 23 (1945), pages 247–251.